Patented Dec. 14, 1937

2,101,834

UNITED STATES PATENT OFFICE 2,101,834

COMPOSITIONS OF MATTER FOR PHOTOGRAPHIC PROCESSING BATHS

Fred R. Bean, Rochester, N. Y., assignor, by mesne assignments, to Eastman Kodak Company, Jersey City, N. J., a corporation of New Jersey No Drawing. Application January 29, 1936, Serial No. 61,428

3 Claims. (Cl. 95—88)

This invention refers to photographic chemicals and more particularly to dry, prepared mixtures for use in making up photographic baths, such as acid hardening fixing baths and toning baths. Such mixtures are usually marketed in packages containing a sufficient amount of ready-mixed, dry chemicals to make up a certain definite quantity of the desired bath.

In acid hardening fixing baths and in certain toning baths, it is necessary to use an acid. The most commonly used acid for this purpose is acetic acid. Acetic acid, however, is a corrosive liquid, which is more or less unpleasant to keep and handle, but which must, nevertheless, be measured out each time it is desired to make up a batch of one of the baths mentioned above. If it is desired not to handle a liquid, or if the convenience of packaged quantities of dry mixtures of chemicals is sought, it has been customary to use citric or oxalic acid. These acids are both solids, but they do not have the hardening action on the gelatin of the photographic emulsion which acetic acid has; in fact, they may even soften the gelatin.

One object of my invention is to provide dry mixtures of chemicals, suitable for making up acid hardening fixing baths, toning baths, etc., which will have all the convenience offered by mixtures containing citric or oxalic acid, and which, in addition, will have the hardening action and other valuable effects of acetic acid. Other objects will hereinafter appear.

I have discovered that dry mixtures having the advantages mentioned in the preceding paragraph may be prepared by using, as the acid component, acid sodium acetate. This salt has the formula $NaC_2H_3O_2 \cdot HC_2H_3O_2$, and is readily prepared by heating anhydrous sodium acetate with the equivalent quantity of glacial acetic acid until the sodium acetate has all gone into solution, allowing to cool and crystallize and drying for from four to eight hours in dry air at about 30° C. A di-acid sodium acetate, $$NaC_2H_3O_2 \cdot 2HC_2H_3O_2,$$

may be prepared in the same way by using double the amount of glacial acetic acid. Either of these salts is stable in the dry condition, but in aqueous solution decomposes into sodium acetate and free acetic acid.

Theoretically, the proportion of acetic acid in acid sodium acetate is 42.25%. An actual sample, prepared in the form of a fine, dry, granular powder, analyzed 41.90% acetic acid, due possibly to a very slight loss of acetic acid in drying. In calculating the amount of acid sodium acetate to be used in compounding dry mixtures or photographic baths, therefore, it is best to use a slight excess of acid sodium acetate over that theoretically required. The diacid sodium acetate may be used in place of the acid sodium acetate. It is 59.40% acetic acid. The amount to be used should be calculated accordingly.

I give below several examples of dry mixtures made up with the acid sodium acetate which analyzes approximately 42% acetic acid. It will be understood that these examples are given only as illustrations, and that I am not to be limited by them except as indicated in the appended claims.

*Example I.*—A suitable formula for a two-part dry mixture for preparing an acid hardening fixing bath is as follows:

|   |   | Ounces |
|---|---|---|
| A | Sodium thiosulfate, anhydrous | 10 |
|   | Sodium sulfite, desiccated | 1 |
|   | Boric acid, granular | ½ |
| B | Potassium alum | 1 |
|   | Acid sodium acetate | 2 |

These two mixtures are packed in a two-compartment container, in a manner usual in packing dry mixtures of photographic chemicals. For preparing an acid hardening fixing bath, the mixture "A" is dissolved in two quarts of cold water, and the mixture "B" is added slowly to this solution, with stirring. Such a bath is superior, as regards hardening and efficiency, to a bath prepared with citric acid or oxalic acid.

*Example II.*—A suitable formula for a single dry mixture for preparing an acid hardening fixing bath is as follows:

| | | |
|---|---|---|
| Sodium thiosulfate, anhydrous | 10 ounces | |
| Acid sodium acetate | 1 ounce | 75 grains |
| Sodium acetate, anhydrous | | 218 grains |
| Sodium bisulfite | | 364 grains |
| Potassium alum | 1 ounce | 292 grains |

This mixture is packed in a single container, and, for use, is dissolved in two quarts of cold water.

A typical formula for a toning bath for silver photographic images is:

| | |
|---|---|
| Ferric ammonium citrate | 20 grains |
| Potassium ferricyanide | 20 grains |
| Glacial acetic acid | ½ ounce |
| Water | 16 ounces |

*Example III.*—The formula for a dry mixture equivalent to the above toning bath is as follows:

| | |
|---|---:|
| Ferric ammonium citrate | 20 grains |
| Potassium ferricyanide | 20 grains |
| Acid sodium acetate | 1 ounce 85 grains |

For use, this mixture is dissolved in 16 ounces of water.

What I claim as my invention and desire to be secured by Letters Patent of the United States is:

1. A dry mixture of chemicals, suitable for preparing an acid hardening fixing bath by dissolving in water, comprising sodium thiosulfate, potassium alum, and, as an essential acidifying component, an anhydrous acid sodium acetate.

2. A dry mixture of chemicals, suitable for preparing an acid hardening fixing bath by dissolving in water, comprising sodium thiosulfate, potassium alum, and, as an essential acidifying component, anhydrous acid sodium acetate having the formula $NaC_2H_3O_2 \cdot HC_2H_3O_2$.

3. A dry mixture of chemicals, suitable for preparing an acid hardening fixing bath by dissolving in water, comprising sodium thiosulfate, potassium alum, and, as an essential acidifying component, anhydrous diacid sodium acetate having the formula $NaC_2H_3O_2 \cdot 2HC_2H_3O_2$.

FRED R. BEAN.